United States Patent
Ambs et al.

(10) Patent No.: US 9,771,993 B2
(45) Date of Patent: Sep. 26, 2017

(54) ACTUATOR ARRANGEMENT

(71) Applicant: IMS Gear SE & Co. KGaA, Donaueschingen (DE)

(72) Inventors: Marcel Ambs, Furtwangen (DE); Jens Fechler, Huefingen (DE); Florian Boettger, Denkingen (DE)

(73) Assignee: IMS Gear SE & Co., KGaA, Donaueschingen (DE)

( * ) Notice: Subject to any disclaimer, the term of this patent is extended or adjusted under 35 U.S.C. 154(b) by 0 days.

(21) Appl. No.: 14/644,498

(22) Filed: Mar. 11, 2015

(65) Prior Publication Data
US 2015/0308529 A1   Oct. 29, 2015

(30) Foreign Application Priority Data

Mar. 21, 2014  (EP) ..................... 14161069

(51) Int. Cl.
*F16D 65/18* (2006.01)
*B60T 7/10* (2006.01)
(Continued)

(52) U.S. Cl.
CPC .............. *F16D 65/18* (2013.01); *B60T 7/107* (2013.01); *B60T 13/741* (2013.01); *F16D 55/08* (2013.01);
(Continued)

(58) Field of Classification Search
CPC ......... F16F 2121/24; H02K 5/00; H02K 5/04; H02K 5/22; H02K 5/15; B60T 13/741;
(Continued)

(56) References Cited

U.S. PATENT DOCUMENTS 5,777,410 A   7/1998  Asakura et al.
8,177,040 B2 *  5/2012  Matsushita ........... B60T 13/746
                                                        188/158
(Continued)

FOREIGN PATENT DOCUMENTS

CH   102008028950 A1 *  2/2009 ............. H02K 7/116
DE   195 21 394 A1   6/1995
(Continued)

OTHER PUBLICATIONS

Electronic Translation of DE102008028950A1.*
(Continued)

*Primary Examiner* — Anna Momper
(74) *Attorney, Agent, or Firm* — Juneau & Mitchell

(57) ABSTRACT

An actuator arrangement for an electric parking brake or electric motor service brake, having a brake pad adjustment device which can be driven by the actuator arrangement. The invention has a modular construction, comprising: an electric motor, a gear unit, positioned in a housing, coupled to the electric motor and having a functional connection at its output end with the brake pad adjustment device, a means for fastening the actuator arrangement to the brake caliper or the brake pad adjustment device, and a plug receptacle for a plug connector used for the purpose of transmitting electrical signals to the electric motor. The housing has a motor tube molded joined thereto, housing the electric motor, and a motor cap to which is molded, as a single piece, the plug receptacle for a plug connector used for the purpose of transmitting electrical signals to the electric motor.

15 Claims, 7 Drawing Sheets

(51) Int. Cl.
*B60T 13/74* (2006.01)
*F16D 55/08* (2006.01)
*H02K 5/00* (2006.01)
*H02K 5/15* (2006.01)
*H02K 5/22* (2006.01)
*F16D 121/24* (2012.01)
*F16D 125/40* (2012.01)
*F16D 125/46* (2012.01)

(52) U.S. Cl.
CPC .............. *H02K 5/00* (2013.01); *H02K 5/15* (2013.01); *H02K 5/225* (2013.01); *F16D 2121/24* (2013.01); *F16D 2125/40* (2013.01); *F16D 2125/46* (2013.01)

(58) Field of Classification Search
CPC .............. B60T 13/746; F16D 2125/40; F16D 2125/46; F16D 2125/48; F16D 65/08; F16D 65/16; F16D 65/30; F16D 65/38
IPC .............. H02K 5/00,5/04, 5/22, 5/15
See application file for complete search history.

(56) References Cited

U.S. PATENT DOCUMENTS

2014/0034430 A1  2/2014  Fuse et al.

2015/0357886 A1*  12/2015  Ishizeki .................. F04D 25/06
                                                                    310/71

FOREIGN PATENT DOCUMENTS

| DE | 19521394 A1 * | 12/1996 | .............. H02K 5/10 |
| DE | 102007036070 A1 * | 2/2009 | ............ B60T 13/746 |
| DE | 10 2008 030535 A1 | 12/2009 | |
| DE | WO 2010060725 A1 * | 6/2010 | ............ B60T 13/741 |
| DE | 10 2010 032053 A1 | 1/2012 | |
| DE | 10 2012 110791 A1 | 5/2014 | |
| WO | WO 2005/001303 A2 | 1/2005 | |
| WO | WO 2011/076299 A1 | 6/2011 | |
| WO | WO 2011/076366 A1 | 6/2011 | |

OTHER PUBLICATIONS

Electronic Tranlsation of WO 2010060725A1.*
Electronic Translation of DE102007036070A1.*
European Search Report Issued in corresponding European patent application No. 14193890.2, May 4, 2015.
Office Action issued in corresponding Chinese patent application No. 201510196519.6, Jan. 26, 2017.

* cited by examiner

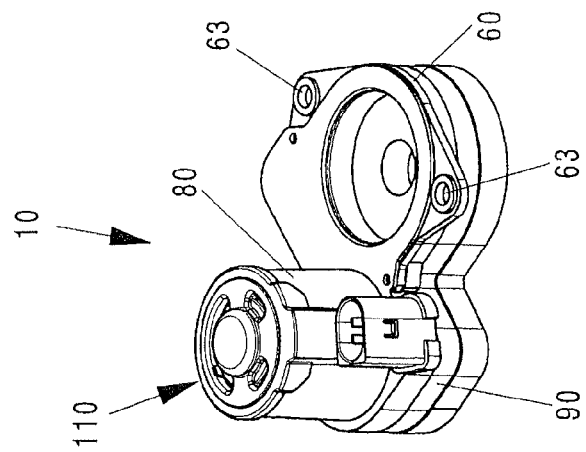
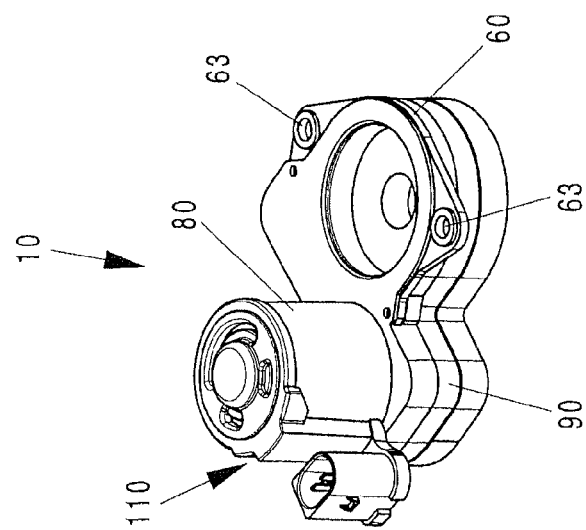
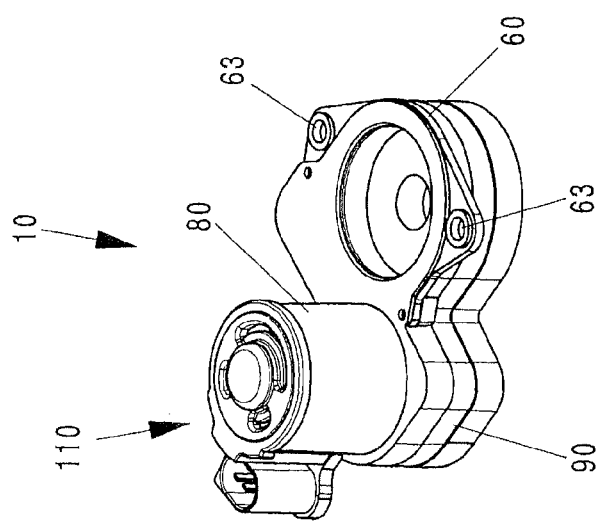

ACTUATOR ARRANGEMENT

CROSS REFERENCE TO RELATED APPLICATIONS

This patent application claims priority to European Patent Application 14 161 069.1, filed on Mar. 21, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is an actuator arrangement for a brake, particularly an electric parking brake and/or electromechanical service brake as found particularly in motor vehicles, according to the features described herein Background of the Invention Such an actuator arrangement is known, by way of example, from DE 10 2008 030 535 A1. The actuator arrangement has a modular construction and comprises a caliper-like brake unit. Two opposing brake pads are arranged in the housing of this brake unit in the known manner, and at least one of these can be displaced via a brake cylinder in the direction of the other one. The actuator arrangement serves the purpose of displacing the brake cylinder. The actuator arrangement has an electric motor and a gear unit which is driven by the electric motor and is designed as a reduction gear unit. At its output, the gear unit is coupled to a brake pad adjustment device for the purpose of moving a piston, which is situated in the interior of the brake pad adjustment device, axially. The movement of this piston then leads to the displacement of the brake pad. The actuator arrangement in this case is bolted to the housing of the brake device via suitable fastening bolts. The gear unit has a belt which is routed on one end thereof around the output sprocket of the electric motor, in a manner which transmits force, and also engages with a drive gear of a planetary gear. At the output, the planetary gear is included for the purpose of producing rotation in a rotary spindle situated in the brake pad adjustment device, to which it is connected in a torque-proof manner, wherein said rotary spindle moves, via the end face thereof, the piston mentioned above.

In this known brake unit, the housing of the brake unit, the electric motor drive device comprising the electric motor, the gear unit, and the control device are constructed as separate modules. According to needs, one of the modules can then be replaced with a module of an accordingly different design, as long as the mechanical interfaces of the individual modules with each other are preserved. Nevertheless, this known brake unit can be improved as far as the matters of simple construction, cost-effective production, and options for adaptation to different requirements are concerned.

The present invention proceeds from this point.

The aim of the invention is to advance the known actuator arrangement for a brake, particularly an electrical parking brake and/or electromechanical service brake, in motor vehicles, in such a manner that it has an even simpler construction and can be produced more cost-effectively. In particular, it should be possible to make modifications corresponding to user needs regarding the interfaces of the actuator arrangement, independently of each other and specific to the given application, in a particularly simple manner.

This aim is addressed by an actuator arrangement having the features described herein.

BRIEF SUMMARY OF THE INVENTION

In a preferred embodiment, an actuator arrangement for a brake, particularly an electrical parking brake or electromechanical service brake, having a brake pad adjustment device which can be driven by the actuator arrangement, wherein the actuator arrangement has a modular construction and the following features:
  an electric motor,
  a gear unit, positioned in a housing, which is coupled to the electric motor and has a functional connection at its output end with the brake pad adjustment device,
  a fastening means for the purpose of attaching the actuator arrangement to the brake caliper or the brake pad adjustment device,
  a plug receptacle for a plug connector used for the purpose of transmitting electrical signals to the electric motor, and
further comprising the following features:
  the housing comprises a motor tube which is molded thereon or joined thereto, within which the electric motor is housed, and a motor cap on which is arranged the plug receptacle for a plug connector used for the purpose of transmitting electrical signals to the electric motor.

In another preferred embodiment, the actuator arrangement as described herein, wherein the motor tube and the motor cap are made of plastic.

In another preferred embodiment, the actuator arrangement as described herein, wherein at least some of the control electronics for the electric motor are arranged on the motor cap, particularly on the side thereof which faces the electric motor.

In another preferred embodiment, the actuator arrangement as described herein, wherein all of the electronic components of the electric motor are arranged on the motor cap, such that the electric motor only becomes a functional unit once the motor cap is connected to the motor housing.

In another preferred embodiment, the actuator arrangement as described herein, wherein the electric motor has a motor housing, and in that the motor cap and the motor housing are joined and fixed to each other, particularly by a plug connection, and in this case a blind joining of the motor cap to the motor housing.

In another preferred embodiment, the actuator arrangement as described herein, wherein the fastening means is designed as a separate exchangeable part, configured with at least one attachment opening, and fixed in a torque-proof manner to the actuator arrangement.

In another preferred embodiment, the actuator arrangement as described herein, wherein the gear unit, with its gear elements, sits in the interior of a gear carrier vessel which forms a housing part of the housing and which has two recesses on its base through which a motor shaft of the electric motor, as well as an output shaft of the gear unit, project, wherein the gear carrier vessel is closed by a housing cap on the side thereof which is opposite the two recesses.

In another preferred embodiment, the actuator arrangement as described herein, wherein the gear carrier vessel is made of plastic and is designed as a single piece together with the motor tube which houses the electric motor.

In another preferred embodiment, the actuator arrangement as described herein, wherein the fastening means are designed as a stamped metal part or a plastic part.

In another preferred embodiment, the actuator arrangement as described herein, wherein the fastening means are designed as an insert part which can be inserted into a groove of the gear carrier vessel and fixed therein in a torque-proof manner.

In another preferred embodiment, the actuator arrangement as described herein, characterized in that the insert part has a clamp-like or at least approximately U-shaped design.

In another preferred embodiment, the actuator arrangement as described herein, wherein the insert part can be connected to the gear carrier vessel by means of pins or bolts.

In another preferred embodiment, the actuator arrangement as described herein, wherein the fastening means are designed as a plug part which is placed on the actuator arrangement in a torque-proof manner.

In another preferred embodiment, the actuator arrangement as described herein, wherein the plug part is fixed to locking noses of the gear carrier vessel and/or the housing cap of the actuator arrangement.

In another preferred embodiment, the actuator arrangement as described herein, wherein the gear carrier vessel and the housing cap are each available in different sizes, wherein the interface to the housing surrounding the electric motor is always rotationally symmetric and designed with the same diameter.

BRIEF DESCRIPTION OF THE DRAWINGS

FIG. 1b is a line drawing evidencing a perspective view of the embodiment in FIG. 1a.

FIG. 11 is a line drawing evidencing an actuator arrangement having a first orientation of the plug receptacle.

FIG. 12 is a line drawing evidencing an actuator arrangement having a second orientation of the plug receptacle.

FIG. 13 is a line drawing evidencing an actuator arrangement having a third orientation of the plug receptacle.

DETAILED DESCRIPTION OF THE INVENTION

Figure 1A:
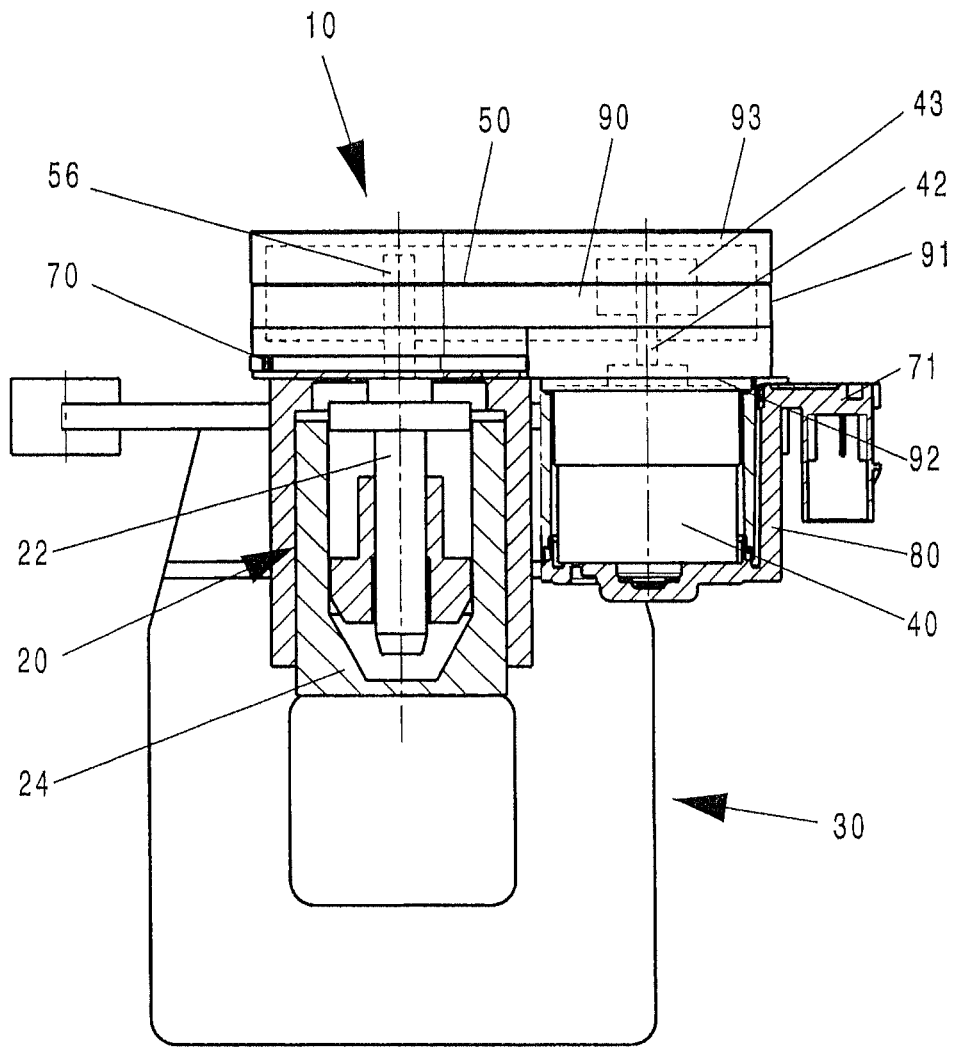
FIG. 1a is a line drawing evidencing a cutaway view of one embodiment of an actuator arrangement arranged on a brake pad adjustment device, having a motor assembly and gear unit positioned in the housing.

The actuator device according to the invention, for an electric parking brake which has a brake pad adjustment device which can be driven by the actuator arrangement, has an actuator arrangement with a modular construction, comprising an electric motor, a gear unit which is positioned in a housing, which is coupled to the electric motor, and which has a functional connection on its output end with the brake pad adjustment device, fastening means for the purpose of attachment of the actuator arrangement to the brake caliper or the brake pad adjustment device, and a plug connection for a connector plug used to transmit electrical signals to the electric motor.

It is essential to the invention that the housing is a molded or joined motor tube in which the electric motor is housed, and a motor cap on which the plug connection for a connector plug is arranged for the purpose of transmitting electrical signals to the electric motor—and particularly is molded as a single piece.

In this way, it is possible to achieve, by means of a housing which is largely based on identical components, merely by selecting the appropriate motor cap, particularly matching the motor cap to the manner and orientation of the plug connection by which the actuator arrangement is supplied with electrical signals and/or operating current, to the requirements of the specific application [sic].

A particularly preferred material for the motor tube and/or the motor cap in this case is plastic.

If the control signals need to be processed by the motor, at least a part of the control electronics for the electric motor can advantageously be arranged on the motor cap, particularly on the side thereof which faces the electric motor. In this case it is particularly advantageous if all electronic components of the electric motor are arranged on the motor cap, such that the connection between the motor cap and the motor housing is what makes the electric motor into a functional unit.

In order to ensure that the electric motor has a well-defined and stable position in cases where the electric motor is significantly smaller than the cross-section of the motor tube, and in order to ensure that the electrical contacts of the electric motor via which the control signals are relayed to the same are held in a defined position relative to the motor cap, it is preferred that the electric motor has a motor housing and that the motor cap and the motor housing are joined to each other in a fixed position, particularly as a plug connection.

In one advantageous implementation of the invention, the fastening means for the attachment of the actuator arrangement to the brake caliper or the brake pad adjustment device are designed as a separate part, particularly an exchangeable part, and are configured with attachment openings, wherein the fastening means are fixed to the actuator arrangement in a torque-proof manner. In order to match the varying attachment configurations of the different customers, it is accordingly only necessary to provide different, separate parts in which the attachment openings are configured according to specific customer requirements. However, the remaining actuator arrangement does not need to be modified.

In one implementation of the invention, these fastening means are either designed as an insert part, in the manner of a tongue and groove connection, or as a plug part. These fastening means are preferably produced as a stamped part, particularly a metallic stamped part.

Even though it is fundamentally possible for the gear unit to have any arbitrary design, and highly varying gear elements, it is reasonable and also within the scope of the present invention that the individual gear elements comprise a two-stage worm gear driven directly by the motor shaft, comprising a shaft on the output end thereof which drives a rotary spindle positioned in the brake pad adjustment device, by way of example, in a torque-proof manner.

In one implementation of the invention, the gear unit, with its gear elements and the holding elements thereof, is accommodated in the interior of a gear carrier vessel which forms a housing component of the housing. Two recesses are included on the bottom of this gear carrier vessel, wherein the motor shaft of the electric motor, on the one end, and an output shaft of the gear unit, on the other end, project through the same. In this case, a sprocket can be arranged on the motor shaft of the electric motor, likewise guided through the recess. This gear carrier vessel is advantageously closed on the side thereof which is opposite the two recesses by a housing cap.

In another embodiment of the invention, not only the motor tube which accommodates the electric motor, and the motor cap, are made of plastic, but the gear carrier vessel is as well.

In addition, according to the invention, the fastening means mentioned above are designed as a stamped metal part, and/or a stamped and bended metal part; however, as an alternative, the fastening means can also be made of plastic. Such a fastening means can be produced from a sheet metal, by way of example. In this case, the fastening means can either engage with the gear carrier vessel as an insert part, in the manner of a tongue and groove connection, and then be fixed in a torque-proof manner, or can be designed as a plug part, wherein the fastening means are then advantageously designed as an attachment cage.

In the case where the fastening means are designed as an insert part, the same is simply designed as a cramp, or at least with an approximately U-shaped design, and can be inserted into a corresponding, peripheral groove which is configured in the peripheral wall of the gear carrier vessel. The insert part can then be fixed in a torque-proof manner by its shape, by carrying additional torque, and also by additional pins and/or bolts if necessary.

In an additional embodiment of the invention, the fastening means can be fixed as locking noses of the gear carrier vessel and/or of the housing cap of the actuator arrangement.

For the modular construction, noted above, of the entire actuator arrangement, with gear carrier vessel, housing cap, fastening means, and motor cap, it has proven particularly favorable to provide the gear carrier vessels and the associated housing caps in varying sizes depending on the axial distance of the motor shaft to the output shaft of the gear unit. However, according to the invention, in all of these differently sized parts, care is always taken that the interfaces for the fastening means mentioned above—that is, the insert part or the plug part included for the purpose of attachment, on the one hand, and on the other hand the enclosing housing for the motor—always have an identical design. In this way, a great deal of flexibility is achieved without the need to provide housing parts with completely different designs. Accordingly, it is possible with the modular construction of the actuator device suggested according to the invention to match customer-specific interfaces, such as a plug connector, bolt eyelets for the attachment of the actuator arrangement, the axial distance between the motor and the output shaft, the actuator device of an electrical parking brake and/or an electromechanical service brake, completely independently of each other and specific to the application. Thanks to the invention, and in an advantageous manner, it is no longer necessary to conceive and provision entirely re-designed housings, and specifically not in cases where only a single customer interface described above needs to be matched specifically. The actuator device according to the invention has the decisive advantage that each of the named interfaces—that is, the plug connector, bolting eyelets, and the axial distance between the motor shaft and the output shaft—are positioned on a separate housing part. All housing parts can be connected to each other by standardized interfaces on the actuator device.

DETAILED DESCRIPTION OF THE FIGURES

Figure 1B:
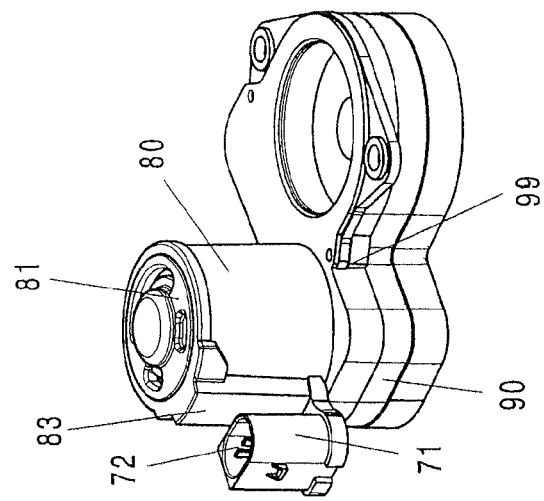

FIG. 1a shows a cutaway view, and FIG. 1b shows a perspective view, of an actuator arrangement 10, which is fixed to a brake pad adjustment device 20 via fastening means 60 which are explained further below. This brake pad adjustment device 20 contains a rotary spindle 22, which can be made to rotate by the actuator arrangement 10 in order to move a piston 24, positioned in the brake pad adjustment device 20, for the purpose of displacing brake pads of a brake caliper 30, which is only indicated schematically in FIG. 1, toward each other. The brake pad adjustment device 20 and the brake caliper 30 are known in and of themselves, such that no further detail is provided on these components of the electrical brake.

Figure 5:
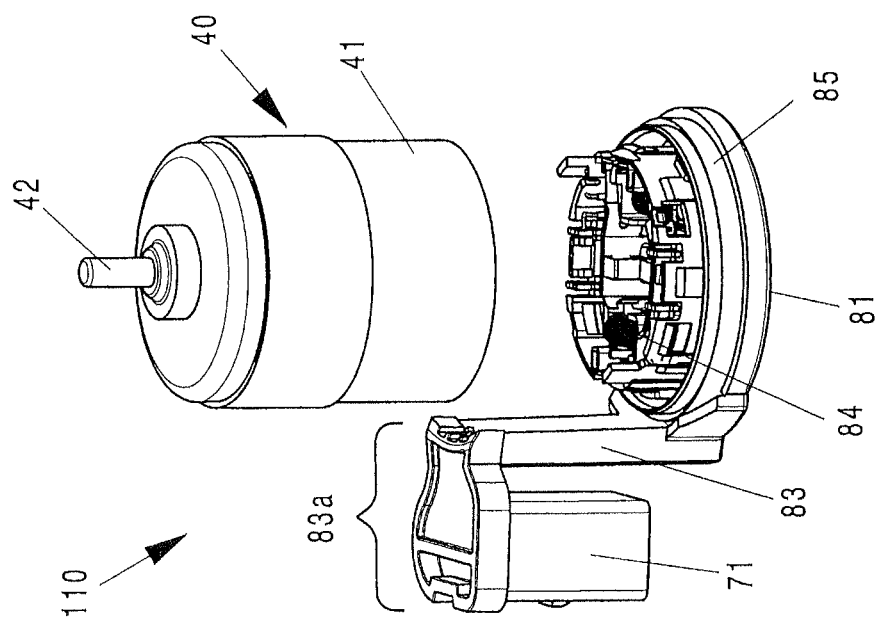
FIG. 5 is a line drawing evidencing the components of a motor assembly.

The actuator arrangement 10 comprises an electric motor drive unit with an electric motor 40, which is in the interior of the housing 90 of the actuator arrangement 10 in the illustration in FIG. 1b, and is not visible. However, as can be seen in FIG. 5, for example, the electric motor 40 also typically has its own housing, which can be metallic and cylindrical, for example, wherein a motor shaft projects from one side thereof. This motor shaft is typically connected in a torque-proof manner to a motor sprocket.

As can be clearly seen in FIGS. 1a and b, the complete electric motor 40, with its own housing, sits in a motor tube 80—that is, in a pipe- or cylinder-shaped segment (if the motor tube 80 is molded to another housing part), or component (if the motor tube 80 is a component of a multi-part housing) of the housing 90. This motor tube 80 preferably consists of plastic and is designed in such a manner that the complete electric motor 40 has sufficient space inside the same. The motor shaft 42, along with the motor sprocket 43, projects out of the open end of the motor tube 80. A motor cap 81 which is preferably made of plastic is joined to the other end of the motor tube 80, and closes the motor tube 80.

A plug receptacle 71 is connected as a single piece to the motor cap 81 via a contact guide 83. Plug contacts 72 are positioned inside the plug receptacle 71 and electrically connected to the electric motor 40, such that an electrical plug connector inserted into the plug receptacle 71, which is itself connected to a corresponding electronic control device, can convey electrical signals to the electric motor, and can also particularly supply the same with a suitable current.

By varying the shape of the plug receptacle 71, its orientation on the contact guide 83, and the geometric profile of the contact guide, it is possible to easily adapt the manner and the positioning of the plug connection being used to the specific requirements. However, this adaptation only influences the design of the motor cap 81 being used, while the rest of the actuator arrangement can then remain substantially unchanged.

FIGS. 11 to 13 show a small selection of the variation options which can be achieved in this manner. As can be seen by comparing these figures, they differ with respect to the direction in which the plug connection faces, and this difference is established solely by different motor caps being installed, while the construction can otherwise remain entirely identical.

As can be seen particularly well in the illustrations in FIG. 2 and FIG. 3, the motor cap 81 is connected to the electric motor 40 and/or the housing thereof—for example, joined to the same, wherein this can be achieved by a plug connection, by way of example—such that the motor cap and the electric motor form a motor assembly 110 which is described in greater detail below with reference to FIGS. 5 and 6.

The end of the motor tube 80 which lies on the opposite end from the motor cap 81 is fixed to a further housing part 90, wherein this further housing part 90 is included as a receptacle for a gear unit 50 and is therefore indicated in the following as a gear carrier vessel 90. The base 92 of this gear carrier vessel 90 includes a first recess 94, wherein the motor shaft 42 mentioned above, including the motor sprocket 43, projects through the same. The gear carrier vessel 90 and the motor tube 80 are primarily formed as a single piece. However, multi-piece embodiments which are connected after production can also be contemplated. The motor tube 80 can then be fixed to the gear carrier vessel 90 if the gear carrier vessel 90 is likewise made of plastic—for example by laser welding or gluing. Other connection options can likewise be considered.

Figure 4:
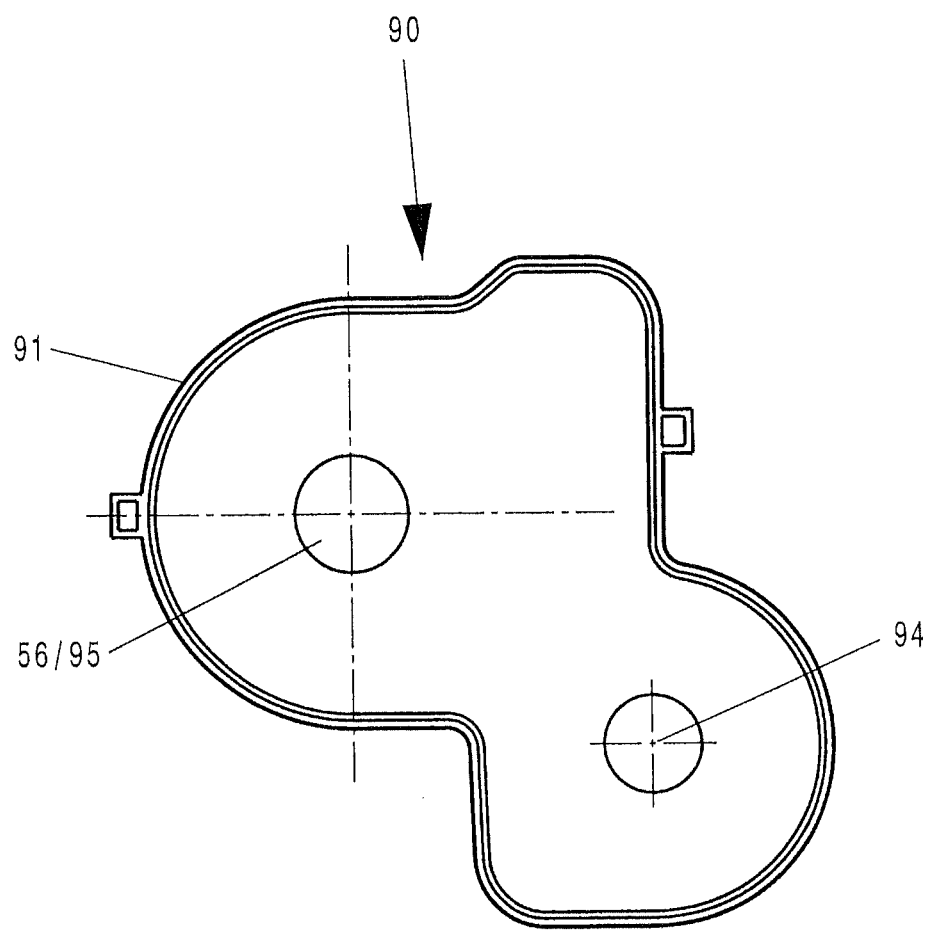
FIG. 4 is a line drawing evidencing a housing part of the actuator arrangement according to FIG. 1 to FIG. 3, in the form of a gear carrier vessel which accommodates a plurality of gear elements.

The gear carrier vessel 90 has a peripheral wall 91 on the base 92 in the direction which faces away from the electric motor 40, such that the gear carrier vessel 90 as a whole has the form of a pot. Further gear elements of the gear unit are positioned between the walls 91. A top view of the pot-like depression of the gear carrier vessel 90 is shown in FIG. 4, in which the first recess 94, also mentioned above, through which the motor shaft 42 projects along with the motor sprocket 43, can also be seen. This output shaft 56 of the gear unit 50 is then connected in a torque-proof manner with the rotary spindle 22 of the brake pad adjustment device 20, as mentioned above, in order to move the piston 24 for the adjustment of the brake caliper.

As shown in FIG. 1, the gear carrier vessel 90 is closed on the upward portion thereof by a housing cap 93, with the exception of the point at which the motor tube 80 is joined to the same, and the two accommodate parts of the gear unit together with the gear carrier vessel.

As the illustrations in FIG. 1, described up to this point, show, the axes of the motor shaft 42 and the output shaft 56 are oriented parallel to each other, wherein the motor tube 80, with the electric motor 40 arranged therein, is oriented directly adjacent to and axially parallel to the brake pad adjustment device 20.

In the embodiment illustrated as FIG. 1, the fastening means 60 are optionally designed as a clamp-like, or at least approximately U-shaped, insert part. This insert part can be a stamped metal part, for example, which engages in a U shape in a corresponding, peripheral groove 99 on the outer periphery of the gear carrier vessel 90.

In this case, the fastening means 60 has one or more attachment openings 63 through which corresponding attachment bolts can be guided in order to bolt the actuator arrangement 10 to the brake caliper 30.

Figure 2:
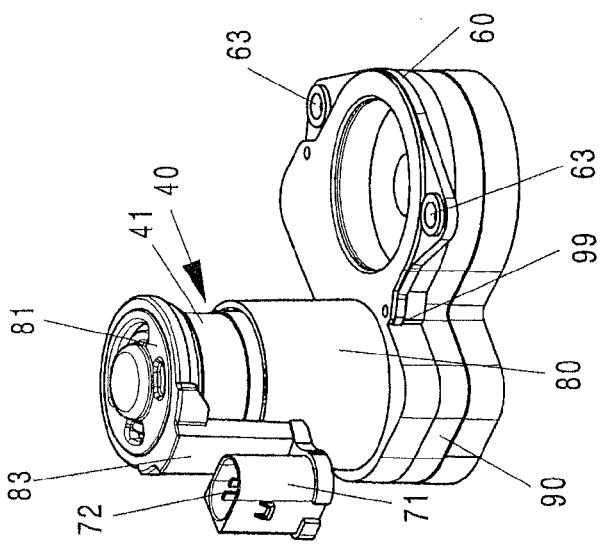
FIG. 2 is a line drawing evidencing the actuator arrangement shown in FIG. 1b, in a perspective view with the motor assembly inserted halfway, wherein the brake pad adjustment device has been excluded.
Figure 3:
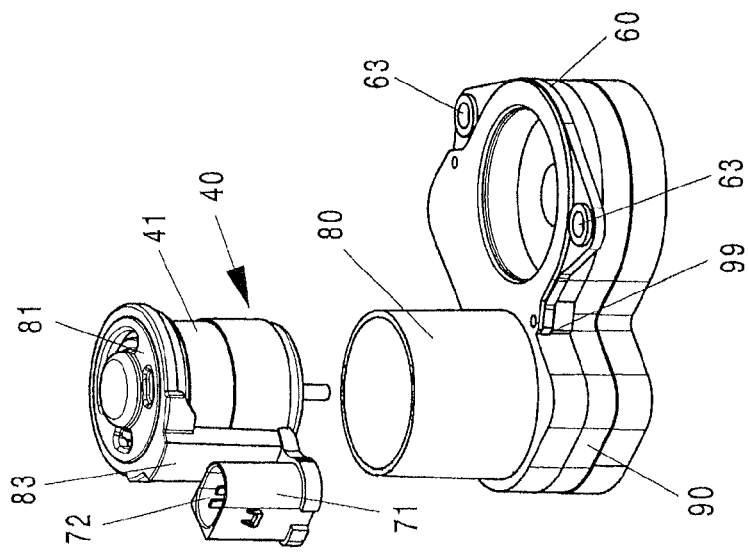
FIG. 3 is a line drawing evidencing a similar view to that of FIG. 2, but with the motor assembly not yet inserted.

The attachment openings 63, of which two are included in each of the FIGS. 1 to 3—however which can also be present in another number in principle—are positioned on fastening lugs 61 which protrude from the gear carrier vessel 90 on the edges thereof when the clamp-like fastening means 60 are inserted into the groove 99 on the outer periphery of the gear carrier vessel 90. For the purpose of fixing the fastening means 60 in or on the gear carrier vessel 90, a bore hole 65 can be included on each of the ends of the two U-shaped legs of the fastening means 60, corresponding to matching bore holes 96 in the gear carrier vessel 90 when the fastening means 60 are inserted, such that bolts or pins can be guided through these openings 63, 96 to optionally additionally fix the fastening means 60 in the gear carrier vessel 90.

In order to meet the needs of different installation requirements, it is possible to achieve high variability with respect to the attachment options, by providing different fastening means 60. In this case, it is only necessary to place the required attachment openings 63 and the associated attachment lugs 61 at other positions. In addition, it is also possible to include more than two attachment openings 63 on the fastening means 60. In order to take into account the various different attachment configurations, it is only necessary to insert an accordingly provisioned fastening means 60 into the groove 99 of the gear carrier vessel 90, and fix the same in that position.

Figure 6:
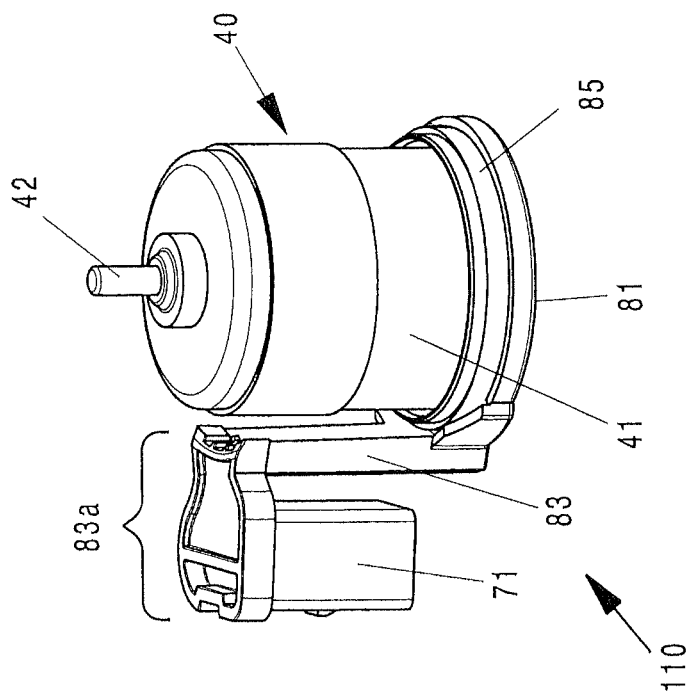
FIG. 6 is a line drawing evidencing the motor assembly constructed from the components in FIG. 5.

FIGS. 5 and 6 show the motor assembly 110, which [consists] of at least the electric motor 40, with the motor housing 41, motor shaft 42 and motor sprocket 43 on the one hand, and the motor cap 81 with the plug receptacle 71 placed thereon as a single piece via the contact guide 83 (wherein the electrical connections, which are not visible, preferably run in the interior thereof).

In the illustrated embodiment, the contact guide 83 runs substantially parallel to the axis of the motor shaft 42, and its end segment 83a is directed at an angle in such a manner that the plug receptacle 71 is arranged approximately at the height of the motor sprocket 43, and is open in the direction of the motor cap 81—downward in the illustration in FIGS. 5 and 6. Naturally, by varying the angle deflection of the end segment 83a of the contact guide 83, it is likewise possible to vary the direction in which the plug receptacle 71 is open—just as it is possible, by varying the direction in which the contact guide 83 varies to vary the distance from the motor, and by varying the length of the contact guide 83 it is possible to vary the height at which the plug receptacle 71 is arranged. As such, the possibility of very simply varying the position of the plug receptacle 71 results from this configuration. In order to fulfill other user requirements with respect to this position, it is only necessary to modify the motor cap 81, out of the entire actuator arrangement 10. Even without modifying the motor cap 81, with the plug receptacle 71 and the contact guide 83, it is possible to simply modify the angle at which the plug receptacle 71 is arranged relative to the axis of the connection between the motor axle and the gearing, because it is only necessary to attach the motor cap 81 for this purpose in another orientation, wherein the plug receptacle 71 points in the desired direction.

The flexibility which can be achieved by this construction, however, goes even farther. As can be seen particularly in FIG. 5, it is particularly possible to arrange at least a part of—or even the entire—control electronics 84, including the contact for the power supply of the electric motor 40, which cannot be seen, on the side of the motor cap 81 which faces the electric motor 40. This is particularly important because the type of the electric motor 40 can also be varied. By way of example, for another consumer, an electric motor can be used which has a smaller diameter than the illustrated electric motor 40. A potential difference in length of the electric motor 40 can be compensated by varying the thickness of the motor cap 81. All of these variations only require a modification of the motor assembly, and are compatible with the same actuator housing due to the fact that the interface 85 between the motor cap 81 and the motor tube 80 can be standardized.

For the assembly of the motor assembly 110 from the components shown in FIG. 5 into the finished assembly shown in FIG. 6, the electric motor 40—particularly the motor housing 41 thereof—is joined to the motor cap 81, particularly with a blind joint. The finished motor assembly 110 can then, as seen in FIGS. 1 to 3 as a series, be inserted into the motor tube 80, to then be attached in the same—which is achieved in particular by joining the motor cap 81 to the motor tube 80.

Figure 7:
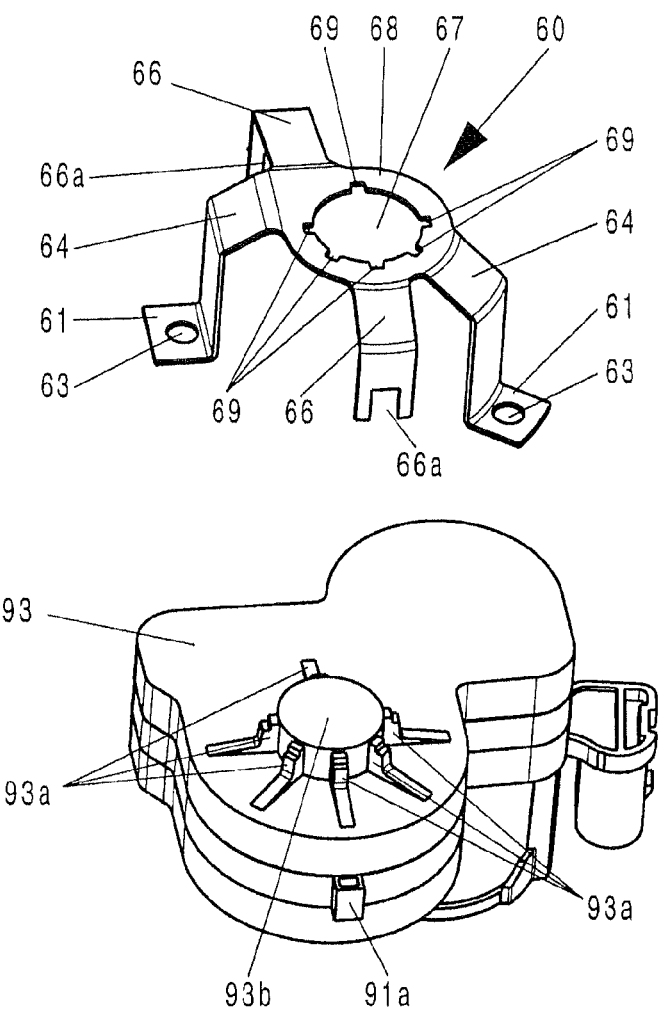
FIG. 7 is a line drawing evidencing a second embodiment of an actuator arrangement wherein the fastening means are designed as a plug part, in an exploded drawing.
Figure 8:
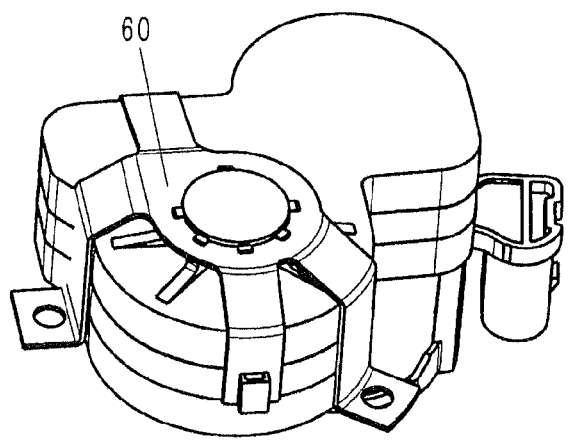
FIG. 8 is a line drawing evidencing a similar view to that of FIG. 7, but in the assembled configuration.

Another option for attaching the actuator arrangement 10 to a brake pad adjustment device 20 is shown in FIGS. 7 and 8. In this case, the gear carrier vessel 90 does not have a groove 99 running around both parts of the gear carrier vessel 90, into which the fastening means 60 are inserted. Rather, it has a plug part and/or an attachment cage which is placed from above onto the actuator arrangement 90, and particularly on the housing cap 93, in a torque-proof manner, and engages around the gear carrier vessel 90 by four arms 64, 66. The cage-like attachment part, again denoted with the reference number 60, comprises a central opening 67 which is edged by an annular fastening part 68. This annular fastening part 68 has multiple—and in this case, seven—grooves 69 on its central opening 67, which can engage in accordingly protruding noses 93a on the housing cap 93 such that the fastening part 60 can then be arranged in this position in a torque-proof manner. An accordingly constructed pin 93b of the housing cap 93 projects through the opening 67 of the fastening part 60.

A total of four legs 66, 64, angled downward, extend away from the annular fastening part 98, and these are designed and angled in such a manner that they can engage around the actuator arrangement 10—that is, the housing cap 93 and the gear carrier vessel 90. The two legs 66 likewise have grooves 66a on their ends which engage in corresponding, protruding noses 90a of the gear carrier vessel 90. This then ensures an additional torque-proof fixation. The two other legs 64 on the fastening part 60 are angled outward by approximately 90° at their distal ends, and have attachment lugs 61 on these ends, in which attachment openings 63 are again configured. The entire actuator arrangement 10 can then be bolted to the brake pad adjustment device 20 by means of these attachment openings 63.

It is clear that it is possible to comply with other attachment configurations of customers for the actuator arrangement 10 by simply modifying, by way of example, the angle of the attachment lugs 64. Only the attachment bore holes 63 need to be moved with the legs 64 on the fastening part 60. By simply exchanging this fastening means 60, therefore, it is possible to ensure great variability of the attachment options of the otherwise unchanged actuator arrangement 10.

Figure 9:
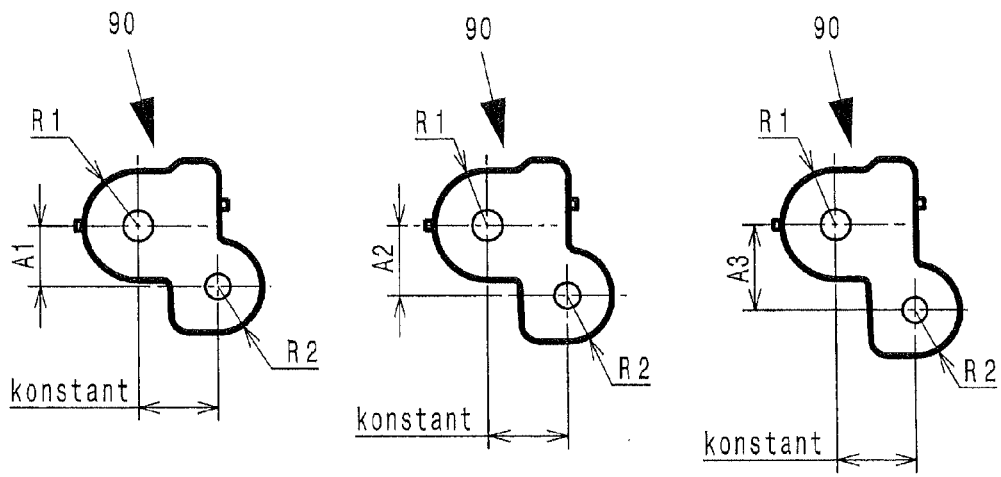
FIG. 9 is a line drawing evidencing various views of gear carrier vessels with different axial distances between the motor shaft and the output shaft of the gear unit.
Figure 10:
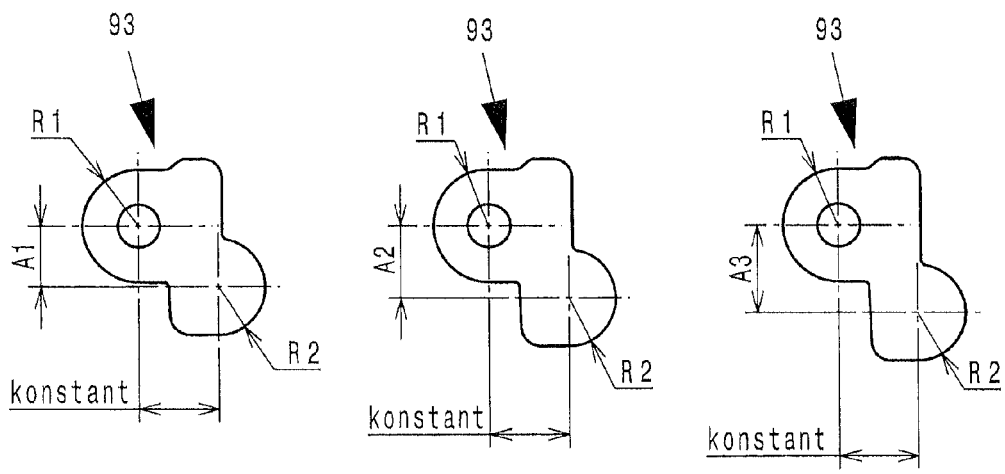
FIG. 10 is a line drawing evidencing housing caps corresponding to the gear carrier vessels illustrated in FIG. 9.

The flexibility of the suggested actuator arrangement is once more illustrated in the context of FIGS. 9 and 10. FIG. 9 shows a top view of the interior of the gear carrier vessel 90. In this case, three different sizes of gear carrier vessels 90 are shown, differing only in that the axial spacing A1, A2, A3 between the recesses 94, 95 is different. The individual interfaces for the attachment of the electric motor 40 and/or the motor tube 80 in which the electric motor 40 is positioned, and the interface for the clamp-like fastening means 60, in contrast, remain unchanged. This means that the radii R1, R2 included in FIG. 9 on the gear carrier vessels 90 continue to be identical for the attachment to and/or molding on of the fastening means 60 and the motor tube 80 noted above. The radius R1 corresponds at least approximately to the radius of the U-shaped and/or clamp-like fastening means 60 in FIG. 2 and FIG. 3, while the radius R2 defines the joining point with the motor cap 81. FIG. 10 shows the housing caps 93 matching the differently sized gear carrier vessels 90 in FIG. 9, each of which likewise differ in length.

LIST OF REFERENCE NUMBERS 10 actuator arrangement
20 brake pad adjustment device
22 rotary spindle
24 piston
30 brake caliper
40 electric motor
41 motor housing
43 motor sprocket
50 gear unit
51 gear element
52 gear element, spindle
53 gear element
54 gear element
56 output shaft
60 fastening means
61 attachment lug
63 attachment opening
64 leg
65 bore hole
66 leg
66a groove
67 opening
68 annular fastening part
69 groove
71 plug receptacle
72 plug contact
80 motor tube
81 motor cap
82 base
83 contact guide
83a end segment
84 control electronics
85 interface
90 housing, gear carrier vessel
90a nose
91 wall
91a locking nose on wall 91 of the housing 90
92 base
93 housing cap 93a locking noses on the housing cap
93b pin
94 recess
95 recess
96 bore hole
99 groove
100 bolt
110 motor assembly
A1 axial distance
A2 axial distance
A3 axial distance
R1 radius
R2 radius
X longitudinal axis The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An actuator arrangement for an electrical parking brake or electromechanical service brake, having a brake pad adjustment device which can be driven by the actuator arrangement, wherein the actuator arrangement has a modular construction and the following features:
    an electric motor having a motor shaft,
    a gear unit with an output shaft, positioned in a housing, which is coupled to the electric motor and has a functional connection at the output shaft with the brake pad adjustment device, the housing being closed on the upward portion thereof by a housing cap,
    the axes of the motor shaft and the output shaft are oriented parallel to each other,
    a fastening means for the purpose of attaching the actuator arrangement to the brake caliper or the brake pad adjustment device,
    a plug receptacle for a plug connector used for the purpose of transmitting electrical signals to the electric motor, and
    further comprising the following features:
    the housing comprises a motor tube which is molded thereon or joined thereto, within which the electric motor is housed, and a motor cap,
    the motor cap is joined with the electric motor and
    the motor cap is connected with the plug receptacle for a plug connector used for the purpose of transmitting electrical signals to the electric motor as a single piece via a contact guide.

2. The actuator arrangement of claim 1, wherein the motor tube and the motor cap are made of plastic.

3. The actuator arrangement of claim 1, further comprising control electronics for the electric motor, arranged on the side of the motor cap which faces the electric motor.

4. The actuator arrangement of claim 3, wherein all of the control electronics are arranged on the motor cap, such that the electric motor only becomes a functional unit once the motor cap is connected to the motor housing.

5. The actuator arrangement of claim 1, wherein the electric motor has a motor housing, and wherein the motor cap and the motor housing are joined and fixed to each other by a blind joining of the motor cap to the motor housing.

6. The actuator arrangement of claim 1, wherein the fastening means is a removable part, configured with at least one attachment opening, and fixed in a torque-proof manner to the actuator arrangement.

7. The actuator arrangement of claim 1, wherein the gear unit, with its gear elements, has a base and sits in the interior of a gear carrier vessel which forms a housing part of the housing and which has two recesses on such base through which a motor shaft of the electric motor, as well as the output shaft of the gear unit, project, wherein the gear carrier vessel is closed by the housing cap on the side thereof which is opposite the two recesses.

8. The actuator arrangement of claim 7, wherein the gear carrier vessel is made of plastic and is a single piece together with the motor tube which houses the electric motor.

9. The actuator arrangement of claim 1, wherein the fastening means is a stamped metal part or a plastic part.

10. The actuator arrangement of claim 7, wherein the fastening means is an insert part which can be inserted into a groove of the gear carrier vessel and fixed therein in a torque-proof manner.

11. An actuator arrangement according to claim 10, wherein the insert part is clamp-like or U-shaped.

12. The actuator arrangement of claim 10, wherein the insert part are connected to the gear carrier vessel by means of pins or bolts.

13. The actuator arrangement of claim 7, wherein the fastening means is a plug part which is placed on the actuator arrangement in a torque-proof manner.

14. The actuator arrangement of claim 13, wherein the plug part is fixed to locking noses of the gear carrier vessel and/or the housing cap of the actuator arrangement.

15. The actuator arrangement of claim 7, further comprising an interface between the housing cap and the housing surrounding the electric motor, wherein such interface is rotationally symmetric and has a uniform diameter.

* * * * *